July 25, 1950     H. C. SCHILDMEIER     2,516,260
TIRE LIFT STRUCTURE
Filed April 16, 1945
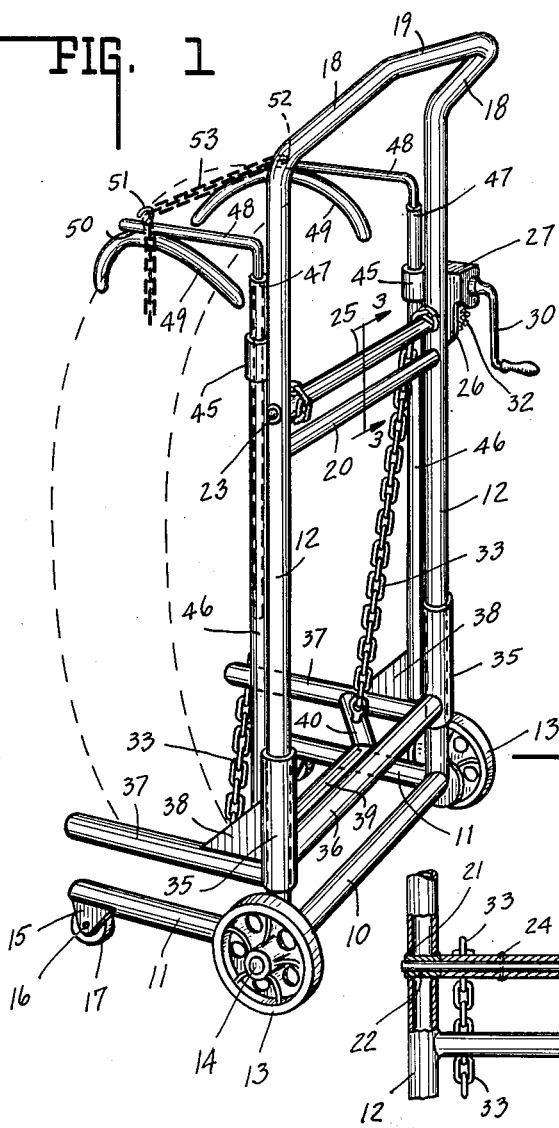
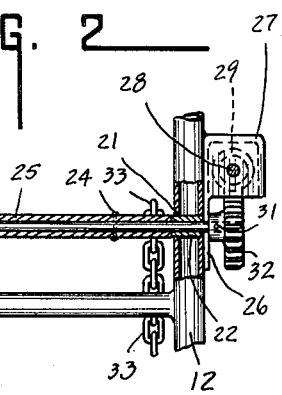
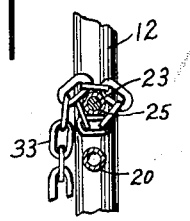
INVENTOR.
HENRY C. SCHILDMEIER.
BY
Lockwood, Goldsmith & Galt,
ATTORNEYS.

Patented July 25, 1950

2,516,260

UNITED STATES PATENT OFFICE 2,516,260

TIRE LIFT STRUCTURE

Henry C. Schildmeier, Indianapolis, Ind.

Application April 16, 1945, Serial No. 588,699

4 Claims. (Cl. 254—4)

This invention relates to a portable tire and wheel elevator.

To reduce tire wear to a minimum it is highly desirable to balance dynamically and statically a tire and wheel. However, larger sizes are particularly hard to handle and bus and large truck tires are especially too heavy for one man to elevate and mount upon the balancing machine spindle.

The chief object of this invention is to provide a portable, manually operable elevator that one man can easily move about and operate to raise such a tire and wheel to spindle height for mounting thereon and when so raised be readily moved for spindle insertion in the wheel for mounting same on the spindle.

The chief feature of the present invention resides in the hand truck type of framework upon which is adjustably mounted the tire elevating means, same being movable by a self-locking power unit, such as a worm and wheel drive.

Other objects and features of the invention will be set forth more fully hereinafter.

The full nature of the invention will be understood from the accompanying drawings and the following description and claims:

In the drawings

Fig. 1 is a perspective view of the tire and wheel portable elevator with the elevating portion partly elevated from the lowest position. Herein a tire only is shown dotted thereon and confined.

Fig. 2 is a rear elevational view of the power portion of the invention, parts being broken away to show same and other parts in section.

Fig. 3 is a transverse sectional view taken on line 3—3 of Fig. 1.

In the drawings 10 indicates a tubular cross member between two forwardly extending, parallel, free end, tubular arm or side members 11 at the rear end thereof. Extending upwardly from each junction of the members is a tubular upright 12. All are transversely positioned as illustrated in Fig. 1.

Extending through tube or cross member 10 is an axle not shown which on the projecting ends mounts large wheels 13, the immediate ends of the axle being headed as at 14 for wheel retention. Other types of wheel retention means may be employed if desired.

Depending from the lower portion at the front end of each side member 11 are the spaced ears 15, apertured to mount the axle 16 carrying smaller wheel 17 between the ears.

Each upright 12 terminates in a rearwardly and upwardly as well as inwardly directed handle portion 18 and same are connected by the upper connecting mid-portion 19 parallel to member 10. The foregoing constitutes the handle for the resulting truck.

About two-thirds up from member 10 and parallel thereto and connected at opposite ends to uprights 12 is the cross brace 20. Above the same at a slight distance each upright 12 is transversely apertured as at 21 and therein is mounted a sleeve 22, said sleeves being longitudinally aligned and herein parallel to cross brace 20 and member 10.

A shaft 23 is rotatably mounted in the sleeve bearings 22 and one end projects beyond one of them as illustrated. Mounted on said shaft 23 and suitably secured thereto as at 24 by pins or rivets is a tube 25 of a length just slightly less than the distances between the uprights. Cross member 20 prevents upright 12 and tube 25 binding since it maintains uprights 12 in the desired spaced relation. Since tube 25 is pinned to shaft 23 the latter cannot move longitudinally and escape from bearings 22.

On the upright 12 adjacent shaft 23 is welded or rigidly mounted plate 26 through which shaft 23 projects. Plate 26 supports a cap type housing 27 which at opposite ends rotatably supports crank shaft 28. Within the housing and rigid with shaft 28 is a worm 29. Shaft 28 is extended rearwardly from the housing and mounts hand crank 30. These may be detachably associated together if desired.

Pinned or otherwise rigidly secured to the projecting end of shaft 23 as at 31 is the worm wheel 32 that projects upwardly into housing 27 and meshes with worm 29. The engagement is guarded by said housing as illustrated. Rotation of crank 30 accordingly rotates tubular member 25. Adjacent each end thereof is secured a chain or cable 33. As the crank is rotated the two chains wind up upon tube 25 and unwind therefrom.

In Fig. 1 two sleeve portions 35 envelop uprights 12 and slide thereon. These sleeves are cross connected by brace 36. Projecting forwardly therefrom and parallel to members 11 are the arms 37 and same may be braced by plates 38 as shown. Secured to member 36 is parallel portion 39 having oppositely and outwardly directed portions 40 secured to arms 37 adjacent the forward termination of plates 38. The result is a rigid connection between the sleeves 35 so that binding of same on uprights 12 due to springing is prevented.

The lower ends of chains 33 are secured to the mid-portions of the angularly directed portions 40. This prevents chain binding on the cross brace 20 when the elevating arms 37 are elevated for the chains coil upon and uncoil from tube 25.

Each upright 12, slightly above the bearing 22 and rearwardly thereof, mounts a tubular guide 45 the same having its axis parallel to the upright 12. Therein is slidably mounted upright member 46 rigid with plate 38 and sleeve 35 and secured thereto in the angle therebetween. Accordingly when the arms 37 are elevated by crank 30 rotation members 46 slide upwardly in guides 45.

Rotatably supported in the upper end 47 of each elevatable member 46 is one end of an angular arm 48. The outer end of said arm carries the arcuate member 49. Adjacent one connection 50 therebetween is a hook 51, and opposite connection 50 mounts at 52 a chain 53. The vertical portion of angular arm 48 not only rotates in but is telescopically associated with the adjacent member 46 which is tubular at 47.

When arms 37 are in the lowest position, chain 53 is detached from hook 51 and the arcuate members 49 are swung outwardly and rearwardly. Then the tire and wheel is placed on the elevator in upright position and lie against members 46. Then the arms 48 are elevated and swung towards each other until arcuate members 49 engage the tire tread. When thus positioned chain 53 is engaged with hook 51 to prevent arm separation. The wheel and tire is now held in desired position on the elevator. Rotation of crank 30 elevates the tire and wheel as desired. Reverse rotation lowers same.

The wheel and tire is usually moved to the balancing machine in lowered position, elevated as required, detached from the elevating mechanism when spindle mounted and then if desired the elevating truck may be removed. When the tire and wheel is balanced the truck is repositioned, the tire and wheel supported and retained thereby in elevated relation, then removed from the spindle and lowered. The truck may then be moved to the vehicle and applied to the axle thereof by moving the free ends of the truck beneath the vehicle axle and swinging arms 49 rearwardly to clear the vehicle. After axle mounting the truck can be removed, and the axle lowered for vehicle support by the tire and wheel.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:
1. In a portable tire lift structure having a wheeled U-shaped base, and a pair of parallel uprights extending upwardly therefrom near one end, a rotatable shaft carried by the upper portions of the uprights and substantially parallel to the base, the combination of guide sleeve means carried by the upper portions of the uprights, a frame having sleeve means slidable on the lower portions of the uprights, a cross member connecting the frame sleeve means together, upwardly directed frame members slidably associated with the guide sleeve means, substantially parallel lateral portions rigid with the frame sleeve means and frame members at the junction thereof, a pair of flexible inextensible means connected to the frame appreciably forwardly of the cross member and adjacent the lateral members, and shaft operable windlass means juxtapositioned to the upright supported sleeve means and connected to the flexible inextensible means.

2. A tire lift structure as defined by claim 1 wherein said shaft extends from upright to upright and has at least one end projecting through one of the uprights, that projecting end terminating appreciably beyond the same, said windlass means comprising said shaft, manually operable means carried by the said one of the uprights and arranged for shaft rotation, tube means enveloping said shaft between the uprights and comprising spacing means therefor and a winding drum for the inextensible means, and means rigidizing the shaft and tube means.

3. A tire lift structure as defined by claim 2 wherein a cross-bar is juxtapositioned to the tube means and is secured at opposite ends to the uprights and is spaced from the tube means sufficiently for single layer winding only of the inextensible means.

4. A tire lift structure as defined by claim 1 wherein a means extends substantially parallel to the central portion of the sleeve connecting frame cross member and is secured thereto and has outwardly and oppositely directed end portions which are rigid with and terminate at the lateral portions immediate the ends of said lateral portions.

HENRY C. SCHILDMEIER.

REFERENCES CITED

The following references are of record in the file of this patent:

UNITED STATES PATENTS

| Number | Name | Date |
|---|---|---|
| 281,472 | Dunan | July 17, 1883 |
| 312,016 | Price et al. | Feb. 10, 1885 |
| 826,877 | Pavey | July 24, 1906 |
| 1,142,738 | Torson | June 8, 1915 |
| 1,306,431 | Klemme | Jan. 10, 1919 |
| 1,640,297 | Rogers | Aug. 23, 1927 |
| 1,847,382 | Collins | Mar. 1, 1932 |
| 2,217,898 | Gemmill | Oct. 15, 1940 |
| 2,364,918 | Robertson | Dec. 12, 1944 |

FOREIGN PATENTS

| Number | Country | Date |
|---|---|---|
| 118,923 | Australia | July 31, 1943 |
| 726,058 | France | Feb. 23, 1932 |